US012614253B2

(12) United States Patent
Hasegawa et al.

(10) Patent No.: US 12,614,253 B2
(45) Date of Patent: Apr. 28, 2026

(54) IMAGING DEVICE, IMAGE GENERATION METHOD, AND RECORDING MEDIUM FOR GENERATING COMPOSITE IMAGE FROM TWO OR MORE IMAGES

(71) Applicant: TANAKA ENGINEERING INC., Saitama (JP)

(72) Inventors: Takayoshi Hasegawa, Saitama (JP); Yukisada Fukaya, Tokyo (JP)

(73) Assignee: TANAKA ENGINEERING INC., Saitama (JP)

( * ) Notice: Subject to any disclaimer, the term of this patent is extended or adjusted under 35 U.S.C. 154(b) by 279 days.

(21) Appl. No.: 18/253,149

(22) PCT Filed: Nov. 9, 2021

(86) PCT No.: PCT/JP2021/041080
§ 371 (c)(1),
(2) Date: May 16, 2023

(87) PCT Pub. No.: WO2022/107635
PCT Pub. Date: May 27, 2022

(65) Prior Publication Data
US 2024/0013360 A1 Jan. 11, 2024

(30) Foreign Application Priority Data
Nov. 17, 2020 (JP) ................................ 2020-190764

(51) Int. Cl.
*G06T 5/50* (2006.01)
(52) U.S. Cl.
CPC ...... *G06T 5/50* (2013.01); *G06T 2207/20221* (2013.01)

(58) Field of Classification Search
CPC ...................................................... G06T 5/60
See application file for complete search history.

(56) References Cited

U.S. PATENT DOCUMENTS

| | | | |
|---|---|---|---|
| 8,994,845 B2 | 3/2015 | Mankowski | |
| 9,769,392 B1 * | 9/2017 | Colburn ................. | G03B 15/05 |

(Continued)

FOREIGN PATENT DOCUMENTS

| | | |
|---|---|---|
| EP | 3606033 A1 | 2/2020 |
| JP | 2020-027982 A | 2/2020 |

(Continued)

OTHER PUBLICATIONS

Oliveira et al., Using Deep Learning and Low-Cost RGB and Thermal Cameras to Detect Pedestrians in Aerial Images Captured by Multirotor UAV, 2018 (Year: 018).*

(Continued)

*Primary Examiner* — Phong X Nguyen
(74) *Attorney, Agent, or Firm* — Rimon P.C.

(57) ABSTRACT

Obtaining a needed image has been difficult with conventional technology. A needed image can be obtained by an imaging device including an optical signal acquisition unit that performs imaging and acquires an optical signal, an original image acquisition unit that acquire two or more different original images using the optical signal, a selection unit that acquires one output image from candidate images including the two or more original images acquired by the original image acquisition unit, and an image output unit that outputs the output image acquired by the selection unit.

11 Claims, 13 Drawing Sheets

(56) References Cited

U.S. PATENT DOCUMENTS

| | | | | |
|---|---|---|---|---|
| 9,996,726 | B2 * | 6/2018 | Chen | G06V 40/1347 |
| 11,748,991 | B1 * | 9/2023 | Day | B60Q 3/85 |
| | | | | 348/143 |
| 2013/0113988 | A1 * | 5/2013 | Wajs | H04N 23/11 |
| | | | | 348/362 |
| 2013/0258112 | A1 * | 10/2013 | Baksht | H04N 23/95 |
| | | | | 348/164 |
| 2015/0055886 | A1 | 2/2015 | Oh et al. | |
| 2017/0011499 | A1 * | 1/2017 | Reinhardt | G01S 7/4815 |
| 2018/0268238 | A1 * | 9/2018 | Khan | G06V 10/751 |
| 2019/0228232 | A1 * | 7/2019 | Lécart | G08G 1/0175 |
| 2019/0244334 | A1 * | 8/2019 | Arakawa | G06V 40/16 |
| 2020/0104584 | A1 * | 4/2020 | Zheng | G06V 20/58 |
| 2020/0186703 | A1 * | 6/2020 | Choi | G06N 3/0464 |
| 2020/0294214 | A1 | 9/2020 | Numata | |
| 2021/0319541 | A1 * | 10/2021 | Treibitz | G06N 3/045 |
| 2022/0044374 | A1 * | 2/2022 | Liu | G06T 5/10 |
| 2022/0103762 | A1 * | 3/2022 | Kandori | H04N 25/131 |
| 2022/0138912 | A1 * | 5/2022 | Zhang | G06T 5/73 |
| | | | | 382/167 |
| 2022/0292658 | A1 * | 9/2022 | Zhang | H04N 9/78 |
| 2023/0260092 | A1 * | 8/2023 | Ng | G06T 5/50 |
| | | | | 382/100 |
| 2024/0013360 | A1 * | 1/2024 | Hasegawa | H04N 23/64 |

FOREIGN PATENT DOCUMENTS

| | | | |
|---|---|---|---|
| JP | 2020-086982 | A | 6/2020 |
| JP | 2020-094985 | A | 6/2020 |
| JP | 2020-118494 | A | 8/2020 |
| JP | 2020-150331 | A | 9/2020 |
| JP | 2020-170966 | A | 10/2020 |

OTHER PUBLICATIONS

Li et al., DenseFuse: A Fusion Approach to Infrared and Visible Images, 2019 (Year: 2019).*

Sun et al., Infrared and Visible Image Fusion Techniques Based on Deep Learning: A Review, 2020 (Year: 2020).*

Notice of Reasons for Refusal issued on Apr. 20, 2021 for the Japanese Patent Application No. 2020-190764, w/ English Translation.

Decision of Refusal issued on Sep. 7, 2021 for the Japanese Patent Application No. 2020-190764, w/ English Translation.

International Search Report issued in corresponding International Application No. PCT/JP2021/041080 dated Feb. 1, 2022 w/ English Translation.

Extended European Search Report received in corresponding European Patent Application No. 21894509.5, dated Sep. 19, 2024.

* cited by examiner

| ID | Original image 1 | Original image 2 | Composite image 1 | Composite image 2 |
|----|------------------|------------------|-------------------|-------------------|
| 1 | ○ | × | × | × |
|   |   |   | · · · · · · | · · · · · · |
| 2 | × | ○ | × | × |
|   |   |   | · · · · · · | · · · · · · |
| 3 | ○ | × | × | × |
|   |   |   | · · · · · · | · · · · · · |
| 4 | × | × | ○ | × |
|   |   |   | · · · · · · | · · · · · · |
| 5 | × | × | ○ | × |
|   |   |   |   | · · · · · · |
| ⋮ | ⋮ | ⋮ | ⋮ | ⋮ |

FIG.12

IMAGING DEVICE, IMAGE GENERATION METHOD, AND RECORDING MEDIUM FOR GENERATING COMPOSITE IMAGE FROM TWO OR MORE IMAGES

CROSS REFERENCE TO RELATED APPLICATIONS

This application is the U.S. National Phase under 35 U.S.C. § 371 of International Application No. PCT/JP2021/041080, filed on Nov. 9, 2021, which in turn claims the benefit of Japanese Application No. 2020-190764, filed on Nov. 17, 2020, the entire contents of each are hereby incorporated by reference.

TECHNICAL FIELD

The present invention relates to an imaging device and the like for acquiring and outputting an image.

BACKGROUND ART

There are various techniques for acquiring a spectral image in the background art (see Patent Documents 1, 2, and 3, for example).

CITATION LIST

Patent Documents

Patent Document 1: JP 2020-11849A
Patent Document 2: JP 2020-94985A
Patent Document 3: JP 2020-86982A

SUMMARY OF INVENTION

Technical Problem

However, in the background art, only a predetermined spectral image is acquired, and thus it has been difficult to obtain a needed image.

Solution to Problem

An imaging device according to a first aspect of the present invention includes: an optical signal acquisition unit configured to perform imaging and acquire an optical signal; an original image acquisition unit configured to acquire two or more different original images using the optical signal; a selection unit configured to acquire one output image from candidate images including the two or more original images acquired by the original image acquisition unit; and an image output unit configured to output the output image acquired by the selection unit.

According to this configuration, a needed image can be obtained.

An imaging device according to a second aspect of the present invention is the imaging device according to the first aspect, further including a composite image acquisition unit configured to acquire a composite image by compositing the two or more original images, wherein the selection unit acquires one output image from three or more candidate images including the two or more original images and the composite image.

According to this configuration, a more appropriate image can be easily obtained.

An imaging device according to a third aspect of the present invention is the imaging device according to the first or second aspect, wherein the selection unit automatically selects the one output image that satisfies a predetermined condition from two or more candidate images.

According to this configuration, a needed image can be easily obtained.

An imaging device according to a fourth aspect of the present invention is the imaging device according to the third aspect, wherein the selection unit performs machine-learning prediction processing using a learning model and the three or more candidate images, acquires image identification information specifying the one output image, and acquires the one output image specified by the image identification information, the learning model being information acquired by performing learning processing using two or more pieces of training data including two or more original images, one or more composite images, and image identification information specifying a selected image.

According to this configuration, a needed image can be obtained.

An imaging device according to a fifth aspect of the present invention is the imaging device according to the first or second aspect, further including an accepting unit configured to accept a user instruction, wherein the selection unit selects the one output image that corresponds to the instruction from two or more candidate images.

According to this configuration, an image that corresponds to a user instruction can be obtained.

An imaging device according to a sixth aspect of the present invention is the imaging device according to the second aspect, wherein the composite image acquisition unit acquires the composite image in which a partial original image of a partial area of one or more original images out of two or more original images is adopted as an area corresponding to the partial area.

According to this configuration, a needed image can be obtained.

An imaging device according to a seventh aspect of the present invention is the imaging device according to the sixth aspect, wherein the composite image acquisition unit acquires the composite image in which a first partial original image of a first area of a first original image out of two or more original images is adopted as an area corresponding to the first area, and in which a second partial original image of a second area of a second original image out of two or more original images is adopted as an area corresponding to the second area.

According to this configuration, a needed image can be obtained.

An imaging device according to an eighth aspect of the present invention is the imaging device according to any one of the first to seventh aspects, wherein the selection unit embeds, in the output image, at least identification information specifying that the output image was acquired by the imaging device, and acquires the output image embedded with the identification information, and the image output unit outputs the output image embedded with the identification information.

According to this configuration, it is possible to determine whether an image is an image that was acquired by the above-described imaging device.

Also, a learning system according to a ninth aspect of the present invention includes an image storage device and a learning device. The image storage device includes: an optical signal acquisition unit configured to perform imaging and acquire an optical signal; an original image acquisition unit configured to acquire two or more different original images using the optical signal; a set storage unit configured to store a set of candidate images including the two or more original images acquired by the original image acquisition unit; a set output unit configured to output the set stored by the storage unit; a selection acceptance unit configured to accept selection of one candidate image from the two or more candidate images included in the set; and a differentiation unit configured to perform differentiation processing in which the candidate image corresponding to the selection accepted by the selection accepting unit is deemed to be a positive result, and one or more unselected candidate images are deemed to be a negative result. The learning device includes: a learning unit configured to acquire a learning model by performing learning processing using two or more data sets including one positive result candidate image and one or more negative result candidate images; and a learning model storage unit configured to store a learning model.

According to this configuration, a learning model for acquiring a needed image can be obtained.

Also, a learning system according to a tenth aspect of the present invention is the learning system according to the ninth aspect, further including a composite image acquisition unit configured to acquire a composite image by compositing the two or more original images, wherein the set storage unit acquires the set of candidate images including the two or more original images acquired by the original image acquisition unit and the composite image acquired by the composite image acquisition unit.

According to this configuration, a learning model for acquiring a needed image can be obtained.

Advantageous Effects of Invention

With the imaging device according to the present invention, a needed image can be obtained.

BRIEF DESCRIPTION OF DRAWINGS

FIG. 12 is a diagram illustrating a training data management table.

DESCRIPTION OF EMBODIMENTS

Figure 1:
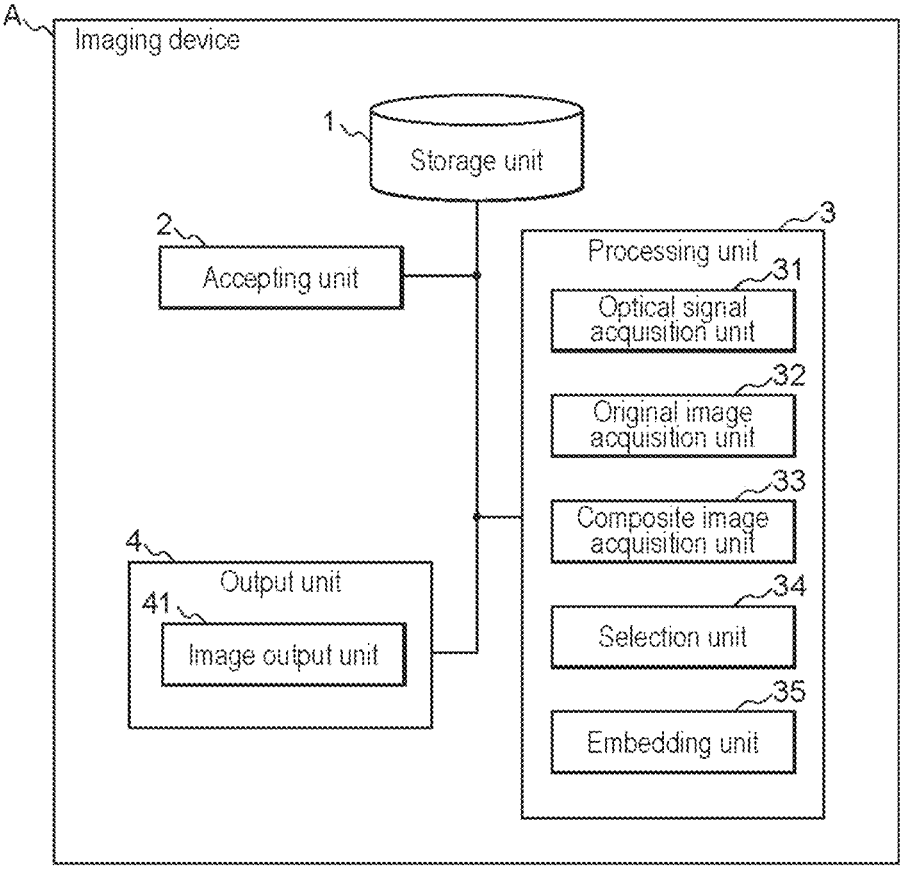
FIG. 1 is a block diagram of an imaging device A according to a first embodiment.

Hereinafter, embodiments of an imaging device and the like will be described with reference to the drawings. Note that constituent elements denoted by the same reference numerals in the embodiments perform similar operations, and therefore redundant descriptions may not be given for such constituent elements.

First Embodiment

In the present embodiment, the following describes an imaging device A that acquires an optical signal by performing imaging, acquires two or more original images using the optical signal, selects one image from two or more candidate images including the two or more original images, and outputs the selected image.

Also, in the present embodiment, the following describes an imaging device A that acquires a composite image, selects one image from three or more candidate images including two or more original images and the composite image, and outputs the selected image.

Note that in the present embodiment, it is preferable that one image is selected automatically, but the selection may also be performed based on a user instruction. Moreover, in the present embodiment, it is particularly preferable that one image is automatically selected by machine learning.

Also, in the present embodiment, it is preferable that the composite image to be used is an image that partially includes an area of an original image as it is. Moreover, it is preferable that the composite image partially includes an area of one original image and partially includes an area of another original image.

Furthermore, in the present embodiment, it is preferable that identification information is embedded in the output image.

FIG. 1 is a block diagram of the imaging device A according to the present embodiment. The imaging device A includes a storage unit 1, an accepting unit 2, a processing unit 3, and an output unit 4.

The processing unit 3 includes an optical signal acquisition unit 31, an original image acquisition unit 32, a composite image acquisition unit 33, a selection unit 34, and an embedding unit 35. The output unit 4 includes an image output unit 41.

Various types of information are stored in the storage unit 1. The various types of information include a later-described learning model, two or more types of original image identification information, one or more types of composite image identification information, and a composite image flag, for example.

The original image identification information is information for identifying the type of original image to be acquired. Examples of the original image identification information include "RGB image", "IR image", and "NIR image". The original image identification information is an identifier of a program (e.g., execution module name, function name, or method name) for acquiring the original image, for example. The original image identification information is an identifier of image processing performed to acquire the original image, for example. The image processing identifier is information that identifies image processing, and includes an ID or an identifier of a program (e.g., execution module name, function name, or method name) for performing one or more types of image processing, for example.

An original image is an image acquired using an optical signal. The original image is an image that has not been composited. For example, the original image is a spectral image obtained by spectrally dividing an optical signal. More specifically, the original image is an image obtained by performing one or more types of predetermined image processing on one spectral image, for example. The original image is an image that can be a candidate image.

The composite image identification information is information for identifying the type of composite image to be acquired. One example of the composite image identification information is an identifier of a program (e.g., execution module name, function name, or method name) for acquiring a composite image. The composite image identification information includes the original image identification information of the original image used when acquiring the composite image, for example. Examples of the original image identification information in such a case include "RGB image", "IR image", and "NIR image".

A composite image is an image obtained by combining two or more images. Note that there are no limitations on the compositing method. A composite image is an image obtained from two or more images.

The composite image flag is information indicating whether or not a composite image is to be acquired.

The accepting unit 2 accepts user instructions. Examples of user instructions include setting information and a selection instruction. The setting information is information for specifying an image that the selection unit 34 is to acquire. A selection instruction is an instruction to select a candidate image from two or more candidate images. The selected candidate image is the output image. Note that a user instruction may be information.

Here, "accept" generally means accepting information received from an input device such as a touch panel, a keyboard, or a mouse. However, "accept" may be a concept that includes, for example, receiving information transmitted via a wired or wireless communication line, or accepting information read from a recording medium such as an optical disk, a magnetic disk, or a semiconductor memory.

A user instruction may be input using any input part, such as a touch panel, a keyboard, a mouse, or a menu screen. The accepting unit 2 can be realized by a device driver for an input part such as a touch panel or a keyboard, control software for a menu screen, or the like.

The processing unit 3 performs various types of processing. The various types of processing are processing performed by the optical signal acquisition unit 31, the original image acquisition unit 32, the composite image acquisition unit 33, and the selection unit 34.

The optical signal acquisition unit 31 performs imaging and acquires an optical signal. Since the optical signal acquisition unit 31 is well-known technology, detailed description thereof will be omitted.

The original image acquisition unit 32 acquires two or more different original images using the optical signal acquired by the optical signal acquisition unit 31. The optical signals on which the two or more different original images are based are the same optical signal.

Also, the objects included in the two or more different original images are generally the same, but may be different. As one specific example, one original image may be an image of the same area as the optical signal, and the other original image may be an image of a partial area of the image (a so-called zoomed image). For example, the original image acquisition unit 32 may divide the optical signal acquired by the optical signal acquisition unit 31 into a near-field "RGB image" and a far-field "IR image". In such a case, the area of the far-field "IR image" is smaller than the area of the near-field "RGB image". As another example, the original image acquisition unit 32 is provided with a beam splitter, the light from a single lens is split into two beams that have the same spectral characteristics by the beam splitter, the two light beams are input to sensors that have different focal lengths, and two images that have different focal lengths (e.g., a "near RGB image" and a "far RGB image") are acquired.

The original image acquisition unit 32 acquires two or more spectral images obtained by extracting part of the wavelengths from the optical signal acquired by the optical signal acquisition unit 31, for example. In such a case, the original image is a spectral image. For example, the two or more spectral images are two or more images from among an RGB image (color image), an IR image (infrared image), and an NIR image (near infrared).

As one example, the original image acquisition unit 32 is a sensor capable of simultaneously capturing an RGB image and an NIR image (e.g., see "http://www.optronics-media-.com/news/20160606/42937/" (accessed Nov. 1, 2020)).

For example, the original image acquisition unit 32 acquires an RGB image from the optical signal acquired by the optical signal acquisition unit 31, and also acquires an image obtained by performing predetermined image processing on the RGB image. In such a case, the original images are an RGB image and an image that was subjected to predetermined image processing. Examples of the predetermined image processing include sharpness processing, noise reduction processing, and brightness improvement processing, and various types of known image processing are applicable.

For example, the original image acquisition unit 32 acquires an IR image from the optical signal acquired by the optical signal acquisition unit 31, and also acquires an image obtained by subjecting the IR image to predetermined image processing. In such a case, the original images are an IR image and an image that was subjected to predetermined image processing, for example. Examples of the predetermined image processing include sharpness processing, noise reduction processing, and brightness improvement processing, and various types of known image processing are applicable.

The original image acquisition unit 32 splits the optical signal acquired by the optical signal acquisition unit 31, and acquires an RGB image and an IR image, for example. The original image acquisition unit 32 then acquires an image obtained by subjecting the RGB image to predetermined image processing and an image obtained by subjecting the IR image to predetermined image processing, for example. In such a case, the original images are an RGB image, an IR image, an image obtained by subjecting the RGB image to predetermined image processing, and an image obtained by subjecting the IR image to predetermined image processing.

Note that the imaging target is the same for the two or more different original images acquired by the original image acquisition unit 32.

The composite image acquisition unit 33 composites two or more original images to acquire a composite image. The composite image acquisition unit 33 may composite an original image and the composite image to acquire a new composite image. There are no limitations on the original image compositing method.

For example, the composite image acquisition unit 33 acquires a composite image in which a partial original image of a partial area of one or more original images out of the two or more original images is adopted as the area corresponding to the partial area.

For example, the composite image acquisition unit 33 acquires a composite image in which a first partial original image, which is a first area of a first original image out of the two or more original images, has been adopted as the area corresponding to the first area, and also a second partial original image, which is a second area of a second original image out of the two or more original images, has been adopted as the area corresponding to the second area.

For example, the composite image acquisition unit 33 acquires one composite image by selecting pixels with higher signal intensities from two or more original images. For example, the composite image acquisition unit 33 composites two or more different original images (e.g., an RGB image and an IR image) using a NAM circuit. Specifically, the composite image acquisition unit 33 acquires a composite image by using a NAM circuit to preferentially output pixel values that have a higher level out of pixels at the same position in the two original images, for example.

For example, the composite image acquisition unit 33 divides each of the two or more original images into predetermined areas, determines which area has a stronger signal intensity for each pair of areas at the same position, and combines the sets of pixels in the determined areas to acquire a composite image. Note that each area includes two or more pixels.

As another example, the composite image acquisition unit 33 may acquire a composite image by compositing two or more original images by supplying the two or more original images and a learning model to a machine-learning prediction processing module. In such a case, the learning model is a learning model acquired by supplying two or more pieces of training data, including two or more original images and a composite image, to a machine-learning learning processing module and executing the module. Note that as previously described, there are no limitations on the machine learning algorithm. Also, the learning model is used in prediction processing in which two or more original images are input and a composite image is output.

Note that the objects in the composite image and the two or more original images are generally the same object, but may be different.

The selection unit 34 acquires one output image from candidate images including the two or more original images acquired by the original image acquisition unit 32.

It is preferable that the selection unit 34 acquires one output image from three or more candidate images including the two or more original images and a composite image.

The selection unit 34 automatically selects one output image that satisfies a predetermined condition from the two or more candidate images.

The predetermined condition is selection by later-described machine-learning prediction processing, for example. For example, the predetermined condition is that a score obtained by later-described machine-learning prediction processing is the highest. As another example, the predetermined condition is that a representative value (e.g., average value or median value) of pixels of the candidate image is the highest. As another example, the predetermined condition is that a representative value (e.g., average value or median value) of an attribute value (e.g., luminance or brightness) of pixels of the candidate image is the highest.

For example, the selection unit 34 performs machine-learning prediction processing using a learning model and two or more candidate images, acquires image identification information that specifies one output image, and acquires the one output image specified by the image identification information. Note that examples of machine learning algorithms include random forest, decision tree, deep learning, and SVM, and there are no limitations on the machine learning algorithm. Also, machine-learning prediction processing can be performed using the TensorFlow library, various types of machine learning functions (e.g., tinySVM, random forest module in R language), or various existing libraries, for example. Also, the learning model is a learning model acquired by a learning device 6 in Embodiment 2, which will be described later, for example. Note that the learning model may also be called a classifier or a model.

Also, the learning model here is information for receiving two or more candidate images and outputting one candidate image or an identifier of one candidate image, for example. For example, the learning model is information for receiving one candidate image out of two or more candidate images, and outputting a flag (true or false) indicating whether or not the candidate image is to be selected as an image to be output. As another example, the learning model is information for receiving one candidate image out of two or more candidate images, and outputting a score and a flag (true or false) indicating whether or not the candidate image is to be selected as an image to be output.

In other words, for example, the selection unit 34 acquires a learning model from the storage unit 1, supplies the learning model and two or more candidate images to a machine-learning prediction processing module, executes the module, and determines one candidate image to be the output image.

As another example, the selection unit 34 acquires the learning model from the storage unit 1. The selection unit 34 then sequentially supplies sets of the learning model and one candidate image out of two or more candidate images to the machine-learning prediction processing module, and acquires a flag indicating selection or no selection, and a score. The selection unit 34 then determines, as the output image, the candidate image that has the highest score among the candidate images that have the flag indicating selection, for example.

The selection unit 34 selects, as the output image, one candidate image that corresponds to a user instruction from two or more candidate images, for example. For example, if the user instruction is setting information, the selection unit 34 selects, as the output image, the candidate image that corresponds to the setting information in the storage unit 1 from two or more candidate images. The setting information is a type identifier indicating the type of one candidate image among the types of the two or more candidate images, for example. Examples of the type identifiers include "RGB image", "IR image", and "composite image".

The user instruction is an instruction to select one candidate image from two or more output candidate images, for example. In such a case, the selection unit 34 selects the one candidate image that corresponds to the user instruction as the output image.

The selection unit 34 may acquire an output image embedded with at least identification information specifying that it is an output image acquired by the imaging device A. Note that the identification information is embedded by the later-described embedding unit 35.

The embedding unit 35 embeds, in the output image, at least identification information specifying that the output image was acquired by the imaging device A. It is preferable that the embedding unit 35 embeds the identification information in the output image acquired by the selection unit 34. However, the embedding unit 35 may embed the identification information in all of the two or more candidate images.

Note that embedding identification information means writing identification information in a header of the output image file, writing identification information in a footer of the output image file, or writing identification information as "digital watermark" information in the output image file, for example. Such embedding of identification information need only enable acquisition of the identification information from an output image data group (e.g., files).

The identification information is information specifying that the image was acquired by the imaging device A, for example. For example, the identification information is a unique ID, which is information that identifies the image. For example, the identification information includes information on one or more of the following: an identifier of the camera (the imaging device A), time stamp information (e.g., year, month, day, hour, minute, second, hour, minute, second), an identifier of the module used in the prediction processing used by the selection unit 34, information identifying the imaging object, information indicating the imaging environment (e.g., indoors or outdoors, or weather), and an encryption key. Note that in such a case, the embedding unit 35 or another technique (not shown) acquires the camera identifier from the storage unit 1, acquires time stamp information from a clock (not shown), acquires the module identifier from the selection unit 34, performs image recognition regarding the imaging object and acquires information identifying the object, performs image recognition regarding the imaging object and acquires information regarding the imaging environment, acquires weather information from a server (not shown), or acquires the encryption key from the storage unit 1.

The output unit 4 outputs various types of information. Examples of such information include a candidate image and an output image. Here, "output" is a concept that includes display on a display, projection using a projector, printing with a printer, transmission to an external device, storage on a recording medium, and passing processing results to another processing device or other program, for example.

For example, the output unit 4 outputs two or more original images acquired by the original image acquisition unit 32. As another example, the output unit 4 outputs two or more original images acquired by the original image acquisition unit 32 and one or more composite images acquired by the composite image acquisition unit 33. Such original images and the like are output for selection by a user.

The image output unit 41 outputs the output images acquired by the selection unit 34. It is preferable that the image output unit 41 outputs output images that are embedded with identification information. The output image acquired by the selection unit 34 is one of the two or more candidate images. Note that here, output is a concept that includes display on a display, projection using a projector, printing with a printer, transmission to an external device, storage on a recording medium, and passing processing results to another processing device or other program, for example.

Also, although it is preferable that the image output unit 41 does not output the one or more candidate images not selected by the selection unit 34, the image output unit 41 may output the one or more candidate images not selected by the selection unit 34. In the case where one or more candidate images not selected by the selection unit 34 are also output, the image output unit 41 outputs the output image acquired by the selection unit 34 in the most prominent mode. For example, the most prominent mode is a mode in which the output image acquired by the selection unit 34 is output at the highest position when two or more images are output in a sorted manner. Another example of the most prominent mode is a mode in which the output image acquired by the selection unit 34 is output with the addition of a mark that is not added to the other candidate images. Any other mode may be used to display an output image is the most prominent mode.

The storage unit 1 is preferably a non-volatile recording medium, but can also be realized by a volatile recording medium.

There are no limitations on the process by which information is stored in the storage unit 1. For example, information may be stored in the storage unit 1 via a recording medium, information received via a communication line or the like may be stored in the storage unit 1, or information input via an input device may be stored in the storage unit 1.

The processing unit 3, the original image acquisition unit 32, the composite image acquisition unit 33, and the selection unit 34 can generally be realized by a processor and a memory, for example. In general, the processing procedure of the processing unit 3 and the like is realized by software, and the software is recorded in a recording medium such as a ROM. However, realization by hardware (dedicated circuitry) is also possible. Note that the processor may be a CPU, an MPU, or a GPU, for example, and any type of processor may be used.

The optical signal acquisition unit 31 is realized by a so-called camera optical component and an imaging element, for example.

The output unit 4 and the image output unit 41 may or may not be thought to include an output device such as a display. The output unit 4 and the like can be realized by output device driver software, or by output device driver software and an output device, for example.

Next, an example of operations of the imaging device A will be described with reference to the flowchart of FIG. 2.
Step S201
The processing unit 3 determines whether or not imaging is to be performed. If imaging is to be performed, the processing moves to step S202, whereas if imaging is not to be performed, the processing returns to step S201. Note that the processing unit 3 determines that imaging is to be performed if the accepting unit 2 accepted an imaging instruction, for example. For example, the processing unit 3 determines that imaging is to be performed from when the accepting unit 2 receives the imaging instruction until when an imaging end instruction is received. There are no limitations on the condition under which the processing unit 3 determines that imaging is to be performed.
Step S202 The optical signal acquisition unit 31 acquires an optical signal.
Step S203 The original image acquisition unit 32 acquires two or more different original images using the optical signal acquired by the optical signal acquisition unit 31. An example of such original image acquisition processing will be described later with reference to the flowchart of FIG. 3.
Step S204 The composite image acquisition unit 33 determines whether or not to acquire a composite image. If a composite image is to be acquired, the processing moves to step S205, and if a composite image is not to be acquired, the processing moves to step S206. Note that the composite image acquisition unit 33 may always acquire a composite image. Also, the composite image acquisition unit 33 may determine to acquire a composite image if the composite image flag in the storage unit 1 is information indicating that a composite image is to be acquired, for example. However, there are no limitations on the condition for determining to acquire a composite image.

Step S205

The composite image acquisition unit 33 acquires a composite image. An example of such composite image acquisition processing will be described later with reference to the flowchart of FIG. 4.

Step S206

The selection unit 34 acquires one output image from a group of candidate images including the two or more original images acquired by the original image acquisition unit 32. Note that it is preferable that the selection unit 34 acquires one output image from three or more candidate images including two or more original images and a composite image. Examples of such selection processing will be described later with reference to the flowcharts of FIGS. 5 and 6.

Step S207

The embedding unit 35 acquires identification information.

Step S208

The embedding unit 35 embeds the identification information acquired in step S206 in the output image acquired in step S206.

Step S209

The image output unit 41 acquires the output image acquired in step S208. The processing returns to step S201. Note that this output image is an output image embedded with identification information.

Figure 2:
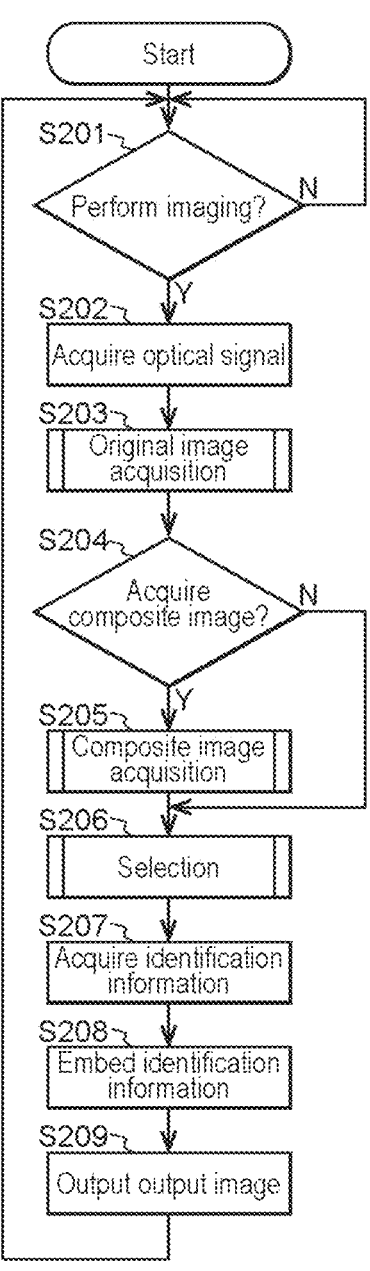
FIG. 2 is a flowchart illustrating an example of operations of the imaging device A.

Note that in the flowchart of FIG. 2, steps S208 and S209 may not be executed. In such a case, identification information is not embedded in the output image.

Also, in the flowchart of FIG. 2, the processing ends when the power is turned off or a processing end interrupt occurs.

Figure 3:
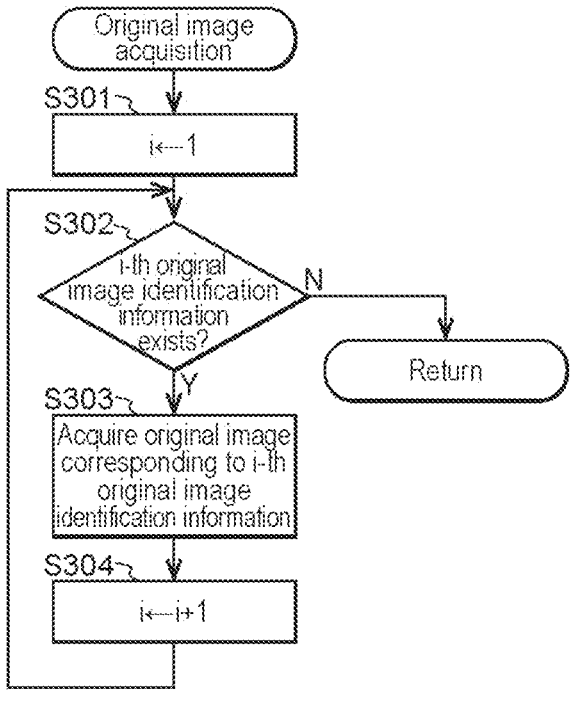
FIG. 3 is a flowchart illustrating an example of original image acquisition processing.

Next, an example of the original image acquisition processing in step S203 will be described with reference to the flowchart of FIG. 3.

Step S301

The original image acquisition unit 32 substitutes 1 for a counter i.

Step S302

The original image acquisition unit 32 determines whether or not i-th original image identification information for acquiring an original image exists in the storage unit 1.

Step S303

The original image acquisition unit 32 acquires the i-th original image that corresponds to the i-th original image identification information, and temporarily stores the acquired original image in a buffer (not shown).

Step S304

The original image acquisition unit 32 increments the counter i by 1. The processing returns to step S302.

Figure 4:
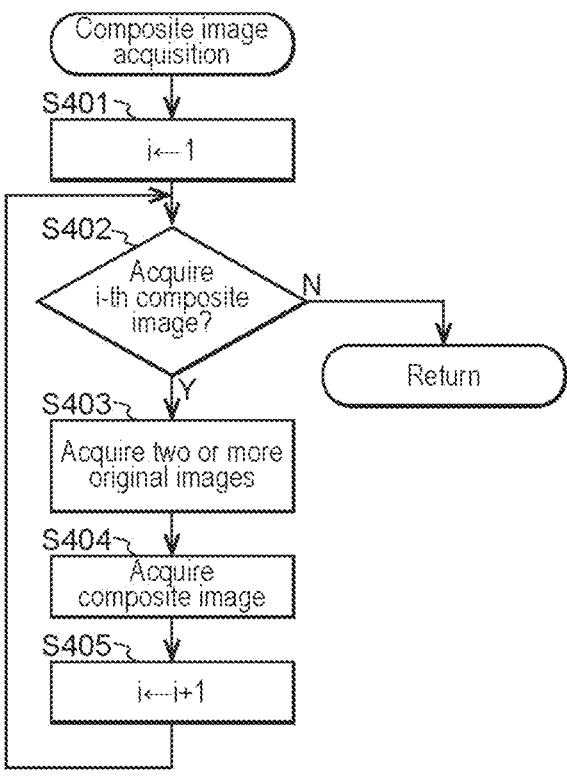
FIG. 4 is a flowchart illustrating an example of composite image acquisition processing.

Next, an example of the composite image acquisition processing in step S205 will be described with reference to the flowchart of FIG. 4.

Step S401

The composite image acquisition unit 33 substitutes 1 for the counter i.

Step S402

The composite image acquisition unit 33 determines whether or not to acquire the i-th composite image. If the i-th composite image is to be acquired, the processing moves to step S403, and if the i-th composite image is not to be acquired, the processing returns to the higher-level processing. Note that the composite image acquisition unit 33 determines whether or not to acquire the i-th composite image based on whether or not i-th composite image identification information exists in the storage unit 1, for example.

Step S403

The composite image acquisition unit 33 acquires two or more original images that are to be used to acquire the i-th composite image from a buffer (not shown).

Step S404

The composite image acquisition unit 33 acquires the i-th composite image using the two or more original images acquired in step S403, and temporarily stores the composite image in a buffer (not shown).

Step S405

The composite image acquisition unit 33 increments the counter i by 1. The processing returns to step S402.

Figure 5:
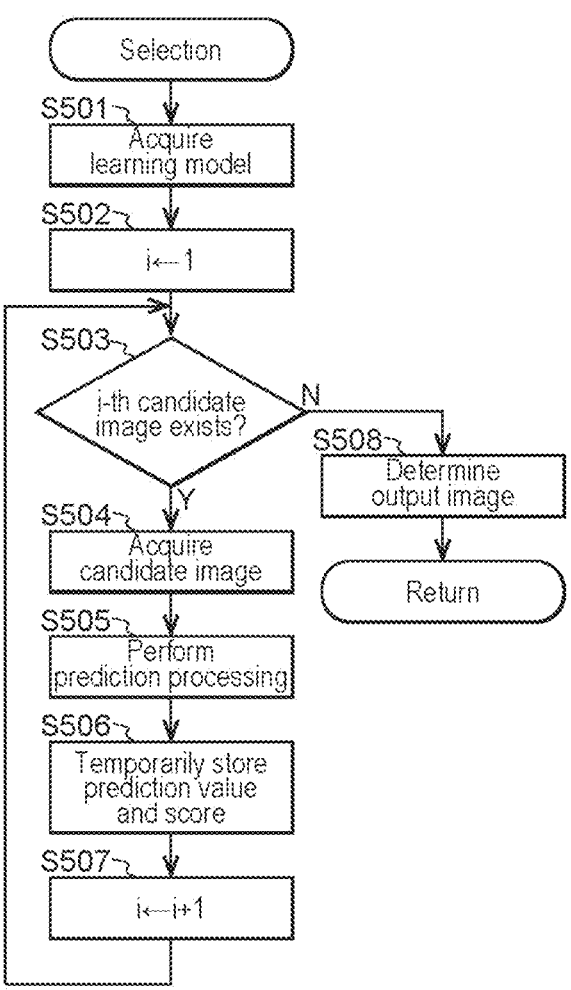
FIG. 5 is a flowchart illustrating a first example of selection processing.

Next, a first example of selection processing in step S206 will be described with reference to the flowchart of FIG. 5.

Step S501

The selection unit 34 acquires a learning model from the storage unit 1.

Step S502

The selection unit 34 substitutes 1 for the counter i.

Step S503

The selection unit 34 determines whether or not an i-th candidate image exists in a buffer (not shown). If the i-th candidate image exists, the processing moves to step S504, and if the i-th candidate image does not exist, the processing moves to step S508.

Step S504

The selection unit 34 acquires the i-th candidate image from a buffer (not shown).

Step S505

The selection unit 34 supplies the learning model and the i-th candidate image to a machine-learning prediction module, executes the prediction module, and acquires a prediction result. Note that the prediction result is a flag (prediction value) indicating whether or not the candidate image is to be selected, and a score. The higher the score is, the greater the likelihood of being selected is.

Step S506

The selection unit 34 temporarily stores the prediction value and the score in a buffer (not shown) in association with the i-th candidate image.

Step S507

The selection unit 34 increments the counter i by 1. The processing returns to step S503.

Step S508

The selection unit 34 determines, as an output image, the candidate image that has the highest score among candidate images whose prediction value indicates being selected. The processing returns to higher-level processing.

Figure 6:
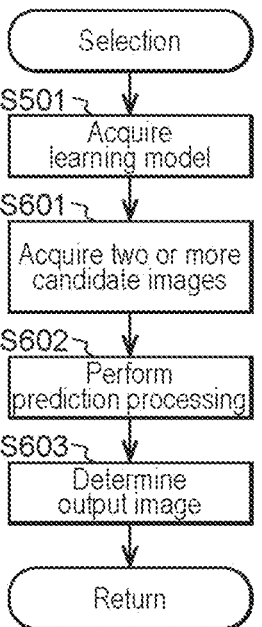
FIG. 6 is a flowchart illustrating a second example of selection processing.

Next, a second example of selection processing in step S206 will be described with reference to the flowchart of FIG. 6. Descriptions will not be given for steps in the flowchart of FIG. 6 that are the same as steps in the flowchart of FIG. 5.

Step S601

The selection unit 34 acquires two or more candidate images from a buffer (not shown).

Step S602

The selection unit 34 supplies the learning model and two or more candidate images to a machine-learning prediction module, executes the prediction module, and acquires a prediction result. Note that the prediction result here is information specifying an output image. The information specifying an output image may be the output image, or may be an identifier (e.g., a file name) of the output image.

Step S603

The selection unit 34 determines the candidate image that corresponds to the prediction result as the output image.

Specific operations of the imaging device A according to the present embodiment will be described below. The imaging device A has the appearance a camera, for example.

Here, assume that two pieces of original image identification information, namely "RGB image" and "IR image", are stored in the storage unit 1. Also assume that composite image identification information, which is the module name of a program for acquiring a composite image, is stored in the storage unit 1. According to this program, out of the "RGB image" and the "IR image", whichever original image has the higher average luminance is adopted as the base image, a license plate area is detected in each of the images, and the license plate area that has a higher sharpness out of the two original images is adopted.

Also, a learning model that selects one candidate image from three candidate images is stored in the storage unit 1. For example, in the case where the imaging target is an automobile, the learning model is data acquired through learning processing performed with training data configured so as to acquire a composite image.

In such a case, it is assumed that the user has input an imaging instruction to the imaging device A. The processing unit 3 accordingly determines that imaging is to be performed. Next, the optical signal acquisition unit 31 performs imaging and acquires an optical signal.

Figure 7:
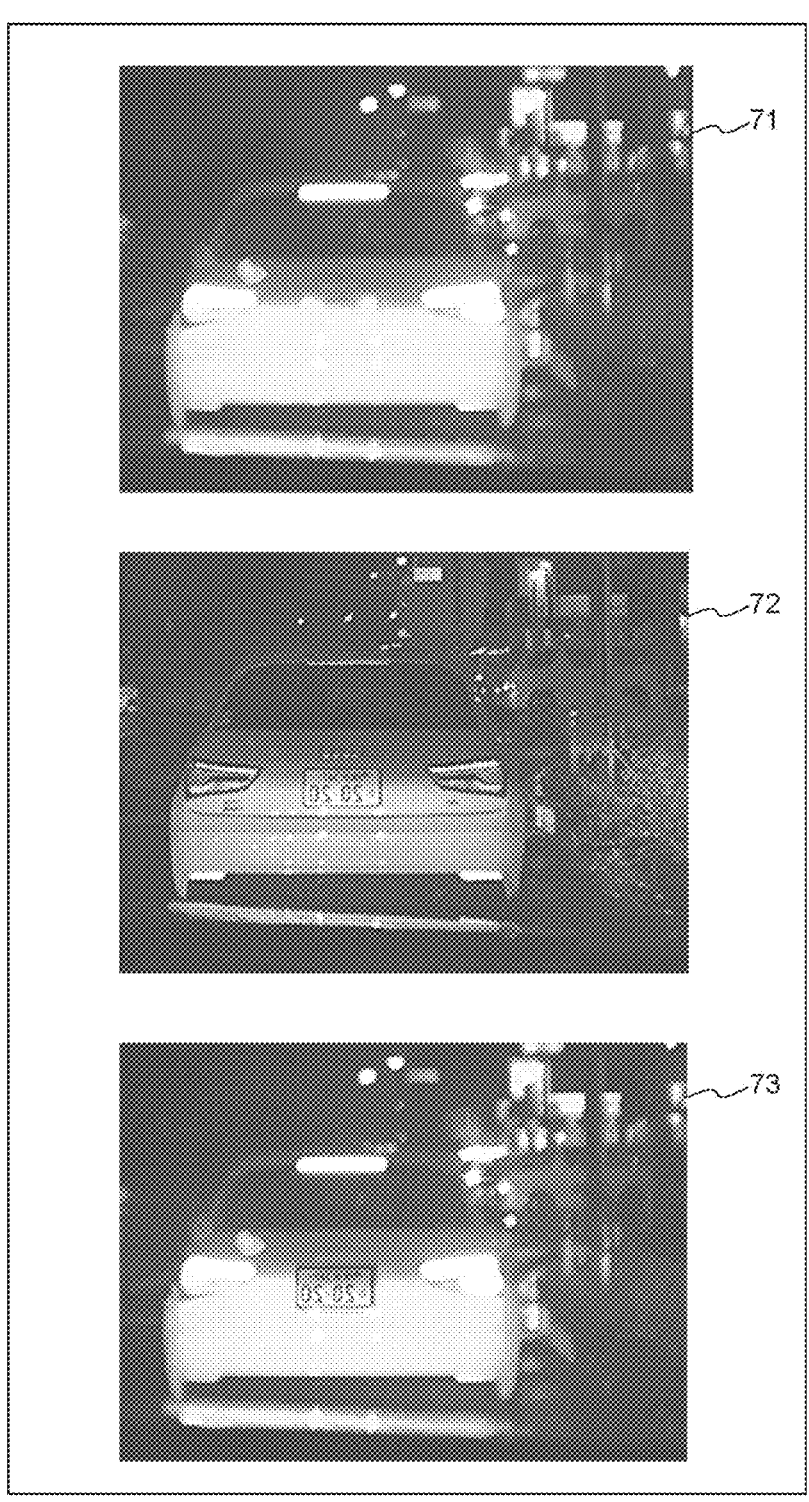
FIG. 7 is a diagram illustrating an example of candidate images.

Next, the original image acquisition unit 32 uses the optical signal acquired by the optical signal acquisition unit 31 to acquire two original images, namely an "RGB image" and an "IR image". The "RGB image" is denoted by 71 in FIG. 7. The "IR image" is denoted by 72 in FIG. 7.

Also, the composite image acquisition unit 33 executes the module identified by the module name indicated by the composite image identification information, and acquires a composite image. This composite image is denoted by 73 in FIG. 7. According to this module, it is determined whether or not the object (imaging object) represented by the optical signal is an automobile, and, in the case where the object is an automobile, a composite image is acquired by cutting out the license plate area from the "IR image" and pasting the image of the license plate area onto the "RGB image". Also, according to this module, if the object (imaging object) represented by the optical signal is not an automobile, the "RGB image" and the "IR image" are composited by a NAM circuit.

Next, the selection unit 34 acquires the learning model from the storage unit 1. It is assumed that the selection unit 34 supplies three candidate images (the "RGB image 71", the "IR image 72", and the "composite image 73") and the learning model to a machine-learning prediction module, executes the prediction module, and acquires one image (here, the composite image 73).

Next, the embedding unit 35 acquires identification information. The embedding unit 35 then embeds the identification information in the composite image 73.

Next, the image output unit 41 acquires an output image. Note that the output image is the composite image 73 embedded with the identification information.

As described above, according to the present embodiment, a more appropriate image can be obtained easily.

Note that the processing in the present embodiment may be realized by software. The software may be distributed by software downloads or any other suitable method. Furthermore, the software may be distributed in a form where the software is stored in a recording medium such as a CD-ROM. Note that this also applies to other embodiments in this specification. Software that realizes the imaging device A in the present embodiment is a program such as follows.

Specifically, this program is for causing a computer to function as an optical signal acquisition unit that acquires an optical signal, an original image acquisition unit that acquires two or more different original images using the optical signal, a selection unit that acquires one output image from candidate images including the two or more original images acquired by the original image acquisition unit, and an image output unit that outputs the output image acquired by the selection unit.

Second Embodiment

In the present embodiment, a learning system that acquires a learning model that can be used by the imaging device A will be described.

Figure 8:
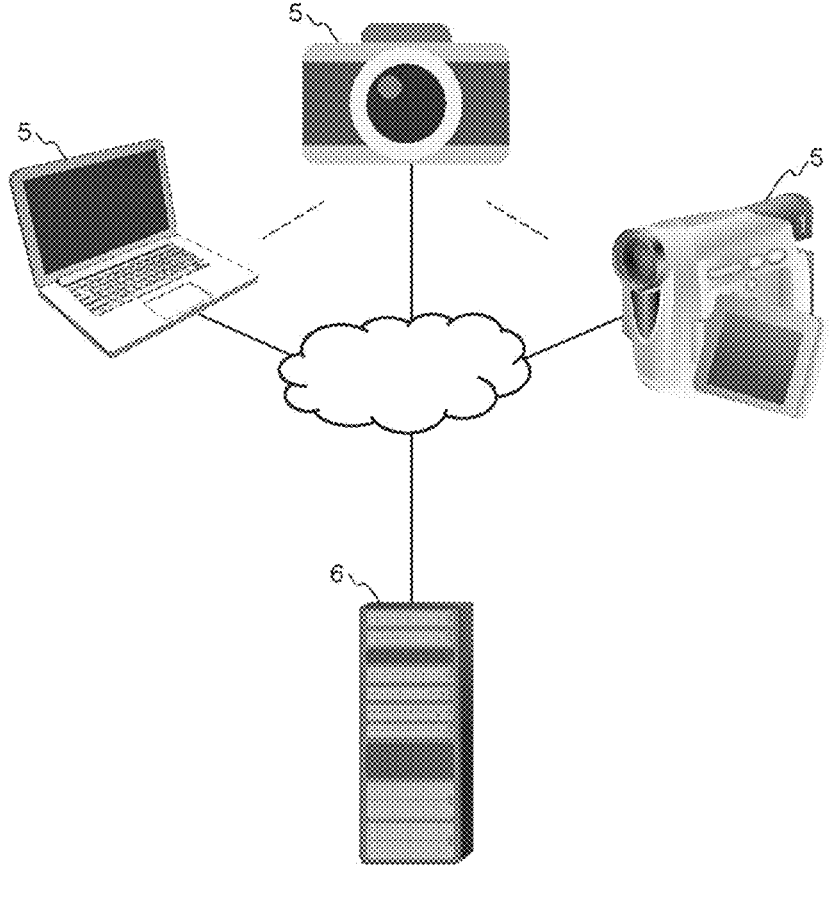
FIG. 8 is a conceptual diagram of a learning system B according to a second embodiment.

FIG. 8 is a conceptual diagram of the learning system B according to the present embodiment. The learning system B includes the image storage device 5 and the learning device 6. Note that the learning system B may be realized by one device, or may be realized by three or more devices.

The image storage device 5 captures an image, acquires a set of two or more candidate images using the captured image, and accepts a selection from the set. The image storage device 5 stores the set in a state in which a selected candidate image and unselected candidate images can be distinguished from each other in the set. The image storage device 5 is a camera or a computer provided with a camera, for example. The camera may be capable of capturing still images or capable of capturing moving images.

The learning device 6 is a device that configures a learning model for selecting one image from two or more candidate images by performing learning processing using two or more sets of data.

Figure 9:
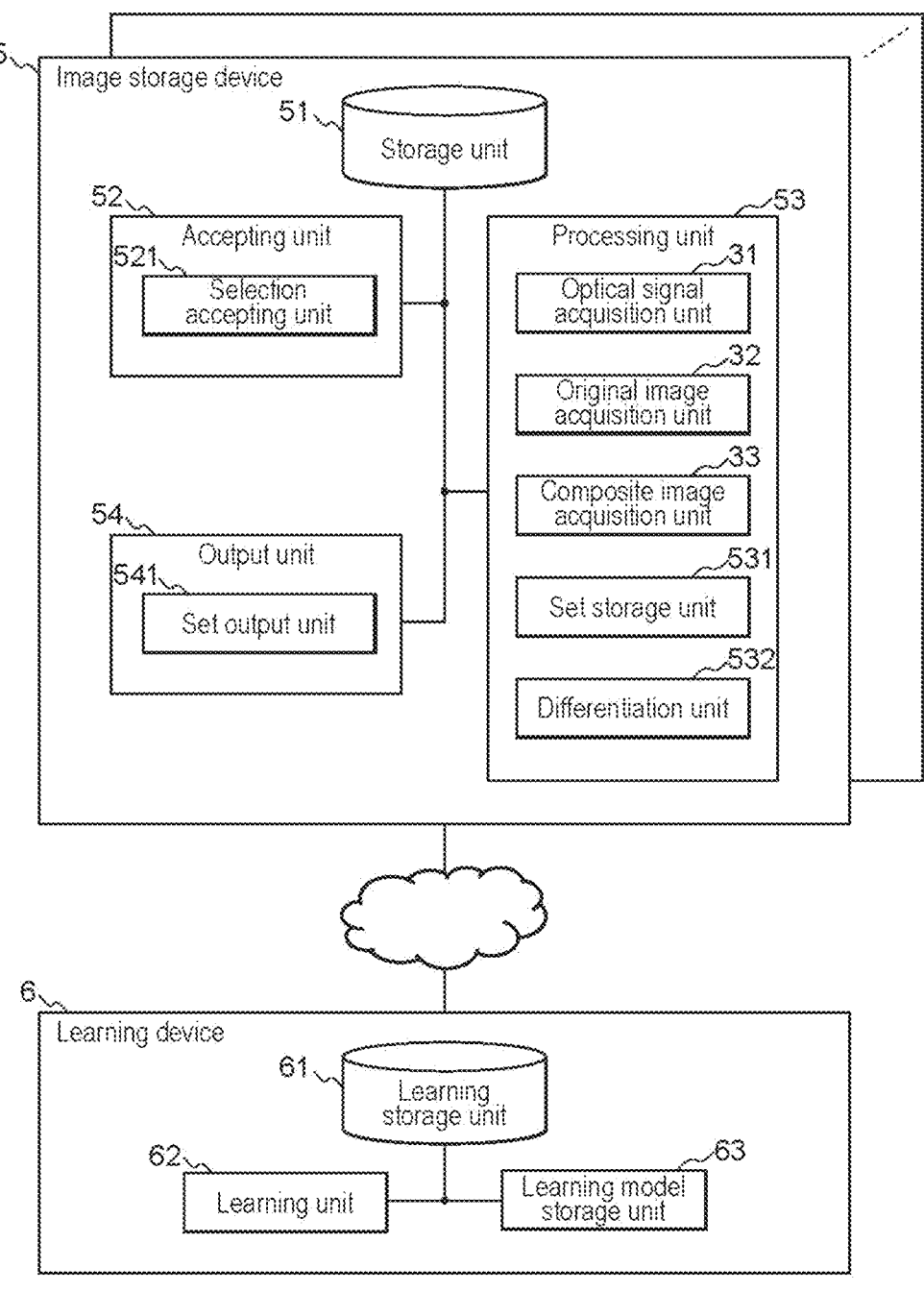
FIG. 9 is a block diagram of the learning system B.

FIG. 9 is a block diagram of the learning system B according to the present embodiment. The image storage device 5 of the learning system B includes a storage unit 51, an accepting unit 52, a processing unit 53, and an output unit 54.

The accepting unit 52 includes a selection accepting unit 521. The processing unit 53 includes an optical signal acquisition unit 31, an original image acquisition unit 32, a composite image acquisition unit 33, a set storage unit 531, and a differentiation unit 532. The output unit 54 includes a set output unit 541.

The learning device 6 includes a learning storage unit 61, a learning unit 62, and a learning model storage unit 63.

Various types of information are stored in the storage unit 51 of the image storage device 5. One example of such information is a set of two or more candidate images.

The accepting unit 52 accepts various types of instructions and information. Examples of such instructions and information include an imaging instruction and a selection instruction. A selection instruction is an instruction to select an image. The selection instruction may simply be called "selection".

The input part for inputting the instructions and information may be realized using any technique, such as a touch panel, a keyboard, a mouse, or a menu screen.

The selection accepting unit 521 accepts selection of one candidate image from two or more candidate images included in a set.

The processing unit 53 performs various types of processing. Examples of such processing include the processing performed by the optical signal acquisition unit 31, the original image acquisition unit 32, the composite image acquisition unit 33, the set storage unit 531, and the differentiation unit 532.

The set storage unit 531 stores a set of candidate images including two or more original images acquired by the original image acquisition unit 32.

It is preferable that the set storage unit 531 stores a set of candidate images including two or more original images acquired by the original image acquisition unit 32 and a composite image acquired by the composite image acquisition unit 33.

The differentiation unit 532 performs differentiation processing in which one candidate image that corresponds to a selection accepted by the selection accepting unit 521 is deemed to be a positive result, and one or more unselected candidate images are deemed to be a negative result. The differentiation processing is processing for associating a positive result flag with one selected candidate image, for example. The differentiation processing is also processing for associating a negative result flag with one or more unselected candidate images, for example. For example, the differentiation processing is processing for associating a positive result flag with one selected candidate image and a negative result flag with one or more unselected candidate images. The differentiation processing is processing for storing one selected candidate image and one or more unselected candidate images in different folders, for example. Any method may be used for the differentiation processing, as long as one selected candidate image can be differentiated from one or more unselected candidate images.

The output unit 54 outputs various types of information. This information includes a set of two or more candidate images. Here, output is a concept that includes display on a display, projection using a projector, printing with a printer, transmission to an external device, storage on a recording medium, and passing processing results to another processing device or other program, for example.

The set output unit 541 outputs a set stored by the storage unit.

Various types of information are stored in the learning storage unit 61 of the learning device 6. This information is two or more sets of data. Each set includes one positive result candidate image and one or more negative result candidate images. A positive candidate image is an image that was selected by the user. The one or more negative result candidate images are images that were not selected by the user. The two or more candidate images in the set were acquired from the same original optical signal.

The learning unit 62 acquires a learning model by performing learning processing using two or more sets each including one positive result candidate image and one or more negative result candidate images.

The learning processing is learning processing performed using a machine learning algorithm. Note that examples of machine learning algorithms include random forest, decision tree, deep learning, and SVM, and there are no limitations on the machine learning algorithm. Also, machine-learning learning processing can be performed using the TensorFlow library, various types of machine learning functions (e.g., tinySVM, random forest module in R language), or various existing libraries, for example.

The learning unit 62 supplies two or more pieces of training data to a machine-learning learning module, executes the learning module, and acquires a learning model.

For example, the learning unit 62 supplies two or more sets, each including one positive result candidate image and one or more negative result candidate images, to a machine-learning learning module, executes the learning module, and acquires a learning model. In other words, one piece of training data here is a set including one positive result candidate image and one or more negative result candidate images.

For example, the learning unit 62 obtains two or more sets, each being a set of one positive result candidate image and one negative result image of the same imaging object as the one positive result candidate image. The learning unit 62 supplies the sets of two or more images to a machine-learning learning module, executes the learning module, and acquires a learning model. In other words, one piece of training data here is a set of one positive result candidate image and one negative result images.

The learning model storage unit 63 stores the learning model acquired by the learning unit 62. There are no limitations on the storage destination of the learning model. For example, the storage destination of the learning model is the learning storage unit 61 here, but may be an external device (e.g., the imaging device A).

The storage unit 51 and the learning storage unit 61 are each preferably a non-volatile recording medium, but can also be realized with a volatile recording medium.

There are no limitations on the processing by which information is stored in the storage unit 51 or the like. For example, information may be stored in the storage unit 51 or the like via a recording medium, information received via a communication line or the like may be stored in the storage unit 51 or the like, or information input via an input device may be stored in the storage unit 51 or the like.

The accepting unit 52 and the selection accepting unit 521 can be realized by a device driver for an input part such as a touch panel or a keyboard, control software for a menu screen, or the like.

The processing unit 53, the optical signal acquisition unit 31, the original image acquisition unit 32, the composite image acquisition unit 33, the set storage unit 531, the differentiation unit 532, the learning unit 62, and the learning model storage unit 63 can generally be realized by a processor and a memory, for example. In general, the processing procedure of the processing unit 53 and the like is realized by software, and the software is recorded in a recording medium such as a ROM. However, realization by hardware (dedicated circuitry) is also possible. Note that the processor may be a CPU, an MPU, or a GPU, for example, and any type of processor may be used.

The output unit 54 and the set output unit 541 may or may not be thought to include an output device such as a display or a speaker. The output unit 54 and the like can be realized by output device driver software, or by output device driver software and an output device, for example.

Next, an example of operations of the learning system B will be described. First, an example of operations of the image storage device 5 will be described with reference to the flowchart of FIG. 10. Descriptions will not be given for steps in the flowchart of FIG. 10 that are the same as steps in the flowchart of FIG. 2.

Step S1001

The output unit 54 outputs the two or more candidate images that were acquired. Note that the two or more candidate images are two or more original images, for example. As another example, the two or more candidate images are two or more original images and one or more composite images. Note that in general, this output refers to output to a display.

Step S1002

The selection accepting unit 521 determines whether or not a selection from the user was accepted. If a selection was accepted, the processing moves to step S1003, and if a selection was not accepted, the processing returns to step S1002.

Step S1003

The differentiation unit 532 associates the candidate image selected in step S1002 with a positive result flag.

Step S1004

The set storage unit 531 stores a set including two or more candidate images in a manner in which positive result images and negative result images can be differentiated from each other. The processing returns to step S201. Note that the positive result image is the selected candidate image. Also, the negative result image is a candidate image that was not been selected.

Figure 10:
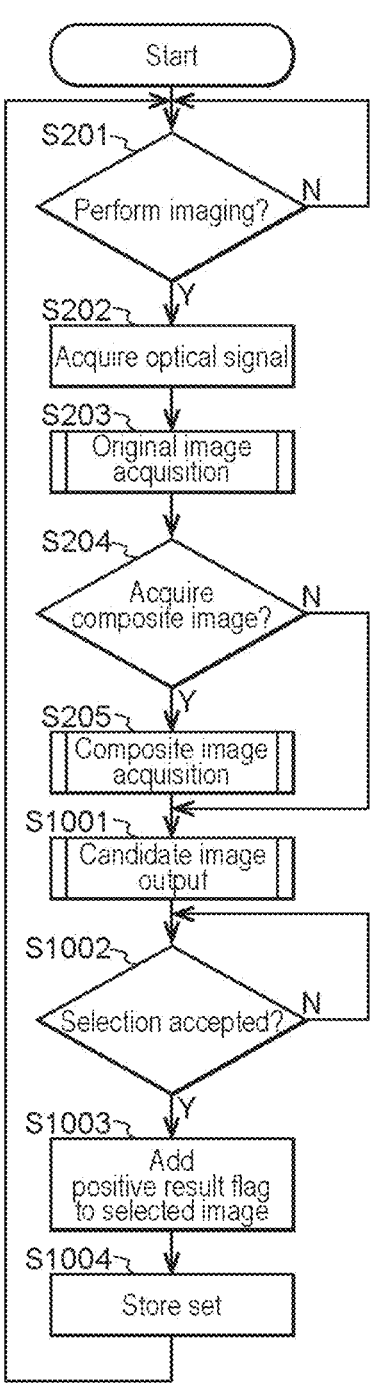
FIG. 10 is a flowchart illustrating an example of operations of an image storage device 5.

Note that in the flowchart of FIG. 10, the processing ends when the power is turned off or a processing end interrupt occurs.

Next, an example of operations of the learning device 6 will be described with reference to the flowchart of FIG. 11. Here, assume that two or more sets of data are stored in the learning storage unit 61.

Step S1101

The learning device 6 determines whether or not learning is to be started. If learning is to be started, the processing moves to step S1102, whereas if learning is not to be started, the processing returns to step S1101. Note that are there are no limitations on the condition for starting learning. For example, the learning device 6 may determine that learning is to be started in accordance with a user instruction.

Step S1102

The learning unit 62 substitutes 1 for a counter i.

Step S1103

The learning unit 62 determines whether or not an i-th set exists in the learning storage unit 61. A set is a set including two or more candidate images stored in a manner in which positive result images and negative result images can be differentiated from each other.

Step S1104

The learning unit 62 acquires one positive result image included in the i-th set. Note that the positive result image is a candidate image associated with a positive result flag.

Step S1105

The learning unit 62 substitutes 1 for a counter j.

Step S1106

The learning unit 62 acquires a j-th negative result image included in the i-th set.

Step S1107

The learning unit 62 acquires a set including the positive result image acquired in step S1104 and the j-th negative result image acquired in step S1106, and temporarily stores the set in a buffer (not shown).

Step S1108

The learning unit 62 increments the counter j by 1. The processing returns to step S1106.

Step S1109

The learning unit 62 increments the counter i by 1. The processing returns to step S1103.

Step S1110

The learning unit 62 supplies two or more sets of a positive result image and a negative result image temporarily stored in the buffer (not shown) to a learning module, executes the module, and acquires a learning model.

Step S1111

The learning model storage unit 63 stores the learning model acquired in step S1110. The processing returns to step S1101.

Figure 11:
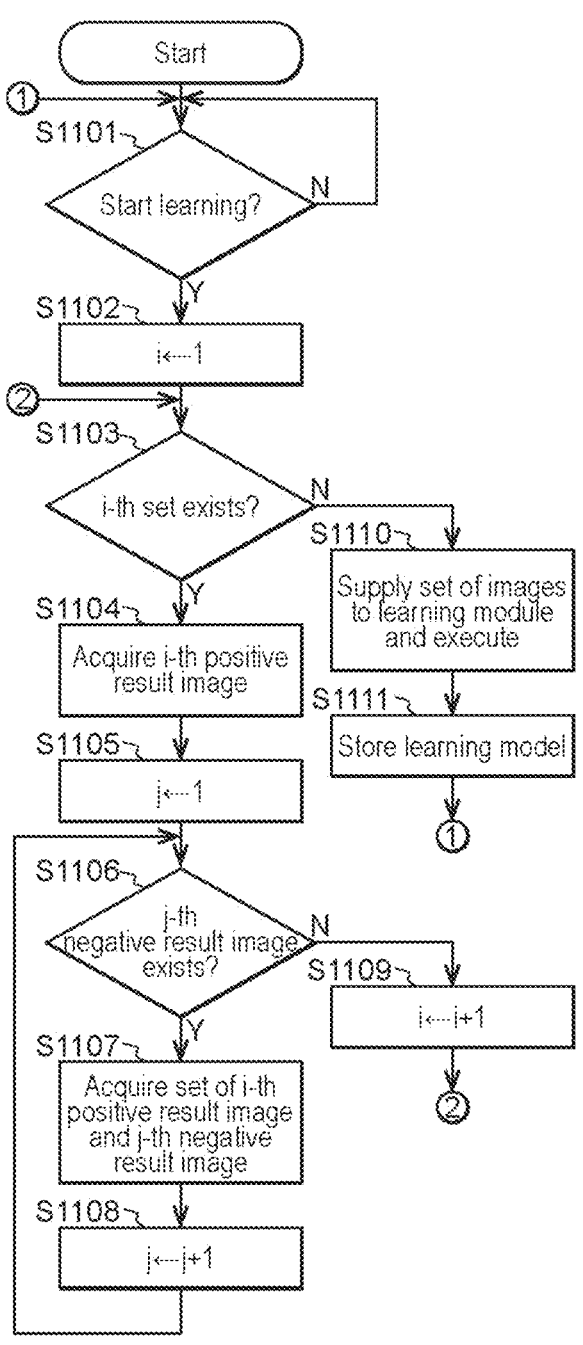
FIG. 11 is a flowchart illustrating an example of operations of a learning device 6.

Note that in the flowchart of FIG. 11, the learning unit 62 may supply two or more sets to a machine-learning learning module, execute the learning module, and acquire a learning model.

Also, in the flowchart of FIG. 11, the processing ends when the power is turned off or a processing end interrupt occurs.

A specific example of operations of the learning system B according to the present embodiment will be described below.

The output unit 54 of the image storage device 5 outputs four candidate images from each of various sets in the storage unit 51, through the processing described above. In this case, the four candidate images are two original images and two composite images. Also, in the case, the two original images are an "RGB image" and an "IR image".

The user then selects one candidate image for each set. The selection accepting unit 521 then accepts the selections. Next, the differentiation unit 532 stores positive result flags in association with the selected candidate images.

Figure 12:
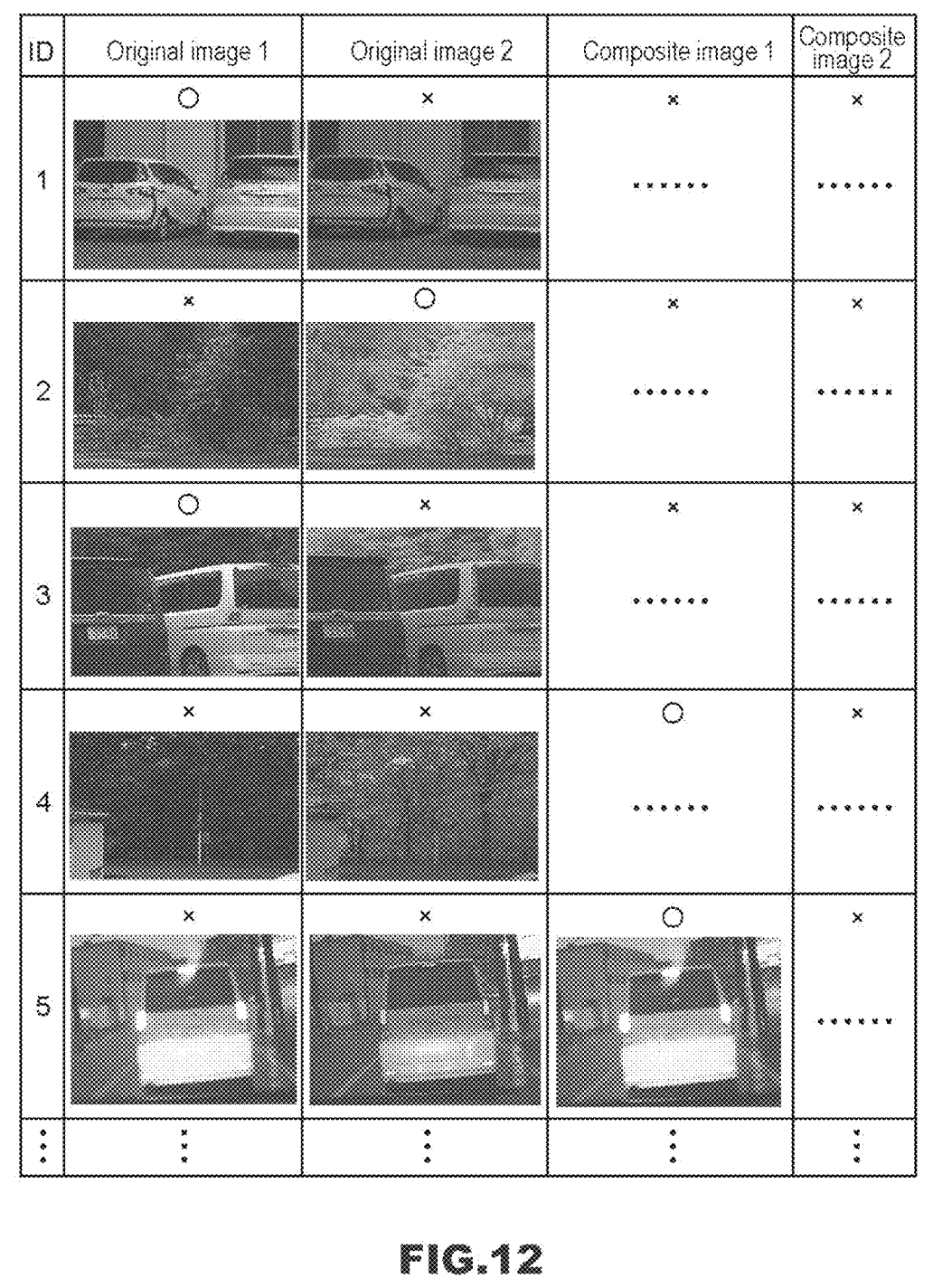

In this case, the training data management table shown in FIG. 12 is stored in the storage unit 51 through the above processing. The training data management table includes two or more pieces of training data, each including an "ID", an "original image 1", an "original image 2", a "composite image 1", and a "composite image 2". The "ID" is information for identifying a set. The "original image 1" is an RGB image, and the "original image 2" is an IR image. The "composite image 1" and the "composite image 2" are composited images obtained by different algorithms, and are composited using the original image 1 and the original image 2, respectively.

The candidate images selected by the user are marked with "O" indicating a positive result, and the candidate images not selected by the user are marked with "X" indicating a negative result.

This training data management table is also stored in the learning storage unit 61 of the learning device 6.

Next, in this case, the learning device 6 determines that learning is to be started.

Next, in according with the flowchart in FIG. 11, for example, the learning device 6 supplies a large amount of the training data in the training data management table to a machine-learning learning module, executes the learning module, acquires a learning model, and stores the learning model in the learning storage unit 61. Note that it is preferable that this learning model is used by the imaging device A described above.

As described above, according to the present embodiment, a learning model for acquiring a needed image can be obtained.

Software that realizes the image storage device 5 in the present embodiment is a program such as follows. Specifically, this program is for causing a computer to function as an optical signal acquisition unit that acquires an optical signal, an original image acquisition unit that acquires two or more different original images using the optical signal, an output unit that outputs two or more candidate images including the two or more original images acquired by the original image acquisition unit, a selection accepting unit that accepts selection of one candidate image from a user, and a differentiation unit that performs differentiation processing in which one candidate image that corresponds to the selection accepted by the selection accepting unit is deemed to be a positive result, and one or more candidate images that were not selected are deemed to be a negative result.

Also, software that realizes the learning device 6 is a program such as follows. Specifically, the program is for causing a computer, which is configured to access a learning storage unit storing two or more sets each including one positive result candidate image and one or more negative result candidate images, to function as a learning unit that performs learning processing using the two or more sets and acquires a learning model, and a learning model storage unit that stores the learning model acquired by the learning unit.

Figure 13:
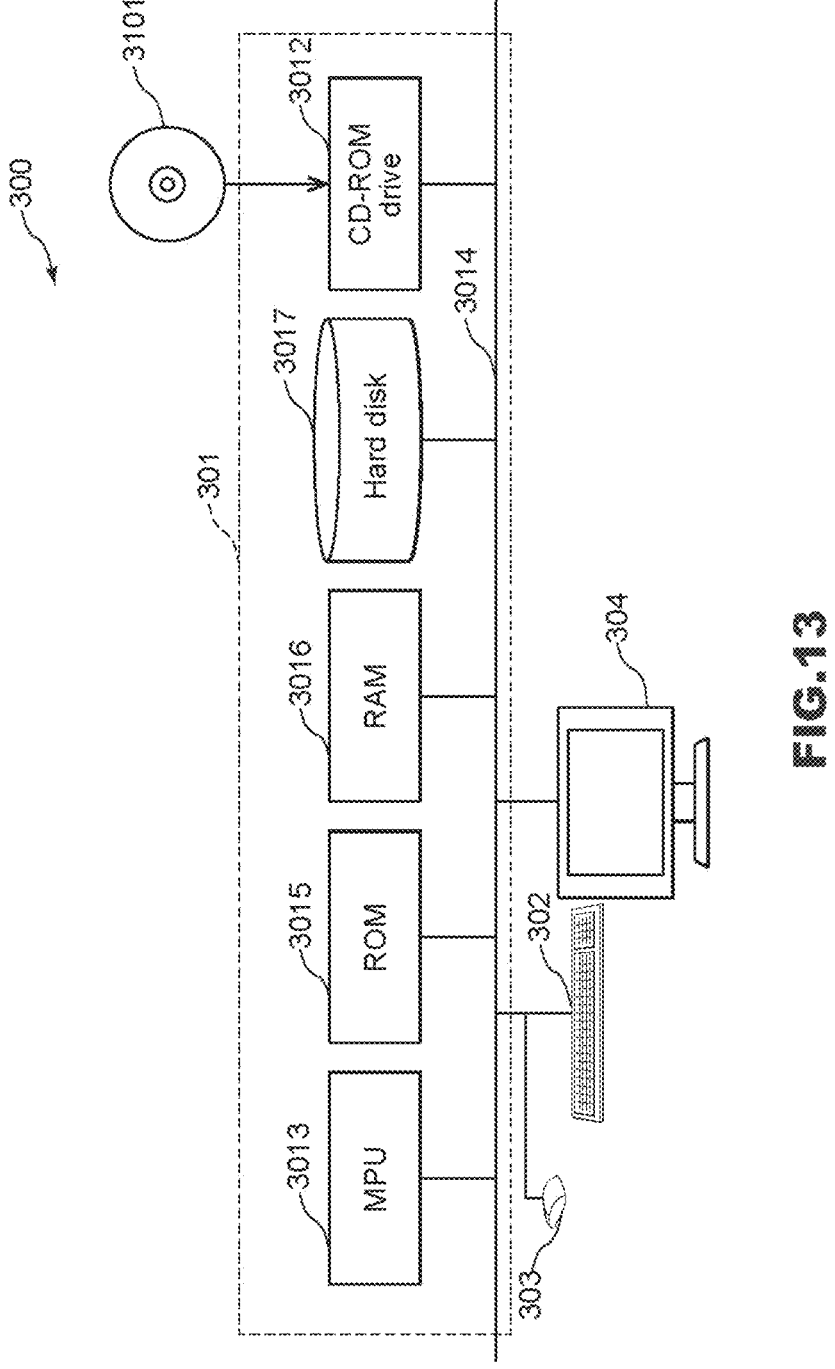
FIG. 13 is a block diagram of a computer system in an embodiment.

Also, the above-described embodiments can be realized by computer hardware and a computer program executed thereon. FIG. 13 is a block diagram of a computer system 300 that can realize the imaging device A, the image storage device 5, and the learning device 6.

In FIG. 13, the computer system 300 includes a computer 301 (which includes a CD-ROM drive), a keyboard 302, a mouse 303, and monitor a 304.

In FIG. 13, the computer 301 includes a CD-ROM drive 3012, an MPU 3013, a bus 3014 connected to the CD-ROM drive 3012 or equivalent, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

A program for causing the computer system 300 to execute the functions of the imaging device A and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded directly from the CD-ROM 3101 or a network.

The program does not necessarily need to include an operating system (OS), a third party program, or the like to cause the computer 301 to execute the functions of the imaging device A in the foregoing embodiment. The program need only include a command portion to call an appropriate function (module) in a controlled mode and obtain desired results. The manner in which the computer system 300 operates is well known, and thus a detailed description thereof has been omitted.

Also, the above program may be executed by a single computer or multiple computers. In other words, centralized processing may be performed, or distributed processing may be performed. In other words, the image storage device 5 and the like may be a stand-alone device, or may be constituted by two or more devices.

Also, in each of the above embodiments, each type of processing may be realized by centralized processing performed by a single device, or may be realized by distributed processing performed by multiple devices.

It goes without saying that the present invention is not limited to the above-described embodiments, and that various modifications are possible and are also included within the scope of the present invention.

INDUSTRIAL APPLICABILITY

As described above, the imaging device according to the present invention has the effect of obtaining a needed image, and is applicable as an imaging device or the like.

The invention claimed is:

1. An imaging device comprising:
an image sensor configured to capture an image of an object and generate an optical signal; and
a processor; and
a recording medium storing a program, wherein the program, when executed by the processor, causes the processor to:
generate two or more original images different from each other from the optical signal;
generate a composite image by compositing the two or more original images;
after the composite image is generated, select one output image, which satisfies a predetermined condition, from three or more candidate images including the composite image and the two or more original images; and
output, to an image display device, the output image, and
when the composite image satisfies the predetermined condition, the processor outputs the composite image as the output image, and
when one of the two or more original images satisfies the predetermined condition, the processor outputs the one of the two or more original images that satisfies the predetermined condition as the output image.

2. The imaging device according to claim 1, further comprising:
a storage unit configured to store a composite image flag indicating whether or not the composite image is to be generated, wherein the executed program causes the processor to:
determine, before starting generation of the composite image, whether the flag indicates that the composite image is to be generated, and in a case where the composite image flag indicates that the composite image is to be generated, generate the composite image by compositing the two or more original images.

3. The imaging device according to claim 1,
wherein the executed program causes the processor to automatically select the one output image that satisfies the predetermined condition from the three or more candidate images.

4. The imaging device according to claim 1,
wherein to select the one image, the executed program causes the processor to
perform machine-learning prediction processing using a learning model and the three or more candidate images,
acquire image identification information specifying the one output image, and
acquire the one output image specified by the image identification information, the learning model being information acquired by performing learning processing using two or more pieces of training data including two or more previously obtained original images, one or more previously obtained composite images, and image identification information specifying a selected image.

5. The imaging device according to claim 1,
wherein the executed program causes the processor to generate the composite image in which a partial original image of a partial area of one or more original images out of the two or more original images is adopted as an area corresponding to the partial area.

6. The imaging device according to claim 5,
wherein the executed program causes the processor to generate the composite image in which a first partial original image of a first area of a first original image out of the two or more original images is adopted as an area corresponding to the first area, and in which a second partial original image of a second area of a second original image out of the two or more original images is adopted as an area corresponding to the second area.

7. The imaging device according to claim 1, wherein the executed program causes the processor to embed, in the output image, at least identification information specifying that the output image was acquired by the imaging device, and acquire the output image embedded with the identification information, and the executed program causes the processor to output the output image embedded with the identification information.

8. The imaging device according to claim 1, wherein the two or more original images are generated by extracting part of wavelengths from the optical signal.

9. The imaging device according to claim 8, wherein:

the executed program causes the processor to accept an instruction given by a user selecting one image from the composite image and the two or more original images, and output the one output image that corresponds to the instruction for further processing.

10. The imaging device according to claim 1, wherein one of the two or more original images is a part of another of the two or more original images.

11. An image generation method comprising:

imaging, by an image sensor, an object and generating an optical signal corresponding to the object;

generating, by a processor, two or more original images different from each other, from the optical signal;

generating a composite image by compositing the two or more original images;

after the composite image is generated, selecting one output image from three or more candidate images including the composite image and the two or more original images; and outputting the output image, wherein in the selecting, as a result of determining that the composite image satisfies a predetermined condition, the composite image is selected as the output image, and as a result of determining that one of the two or more original images satisfies the predetermined condition, the one of the two or more original images that satisfies the predetermined condition is selected as the output image.

* * * * *